United States Patent [19]

Melville

[11] Patent Number: 5,694,237

[45] Date of Patent: Dec. 2, 1997

[54] POSITION DETECTION OF MECHANICAL RESONANT SCANNER MIRROR

[75] Inventor: Charles D. Melville, Issaquah, Wash.

[73] Assignee: University of Washington, Seattle, Wash.

[21] Appl. No.: 719,767

[22] Filed: Sep. 25, 1996

[51] Int. Cl.⁶ .................................................. G02B 26/08
[52] U.S. Cl. .................... 359/214; 359/212; 359/213; 359/223; 359/900; 250/234
[58] Field of Search ........................ 359/196–200, 359/212–215, 221–226, 900; 250/234–236, 206.1; 235/462, 467, 472; 310/36; 348/203, 205

[56] References Cited

U.S. PATENT DOCUMENTS

| 4,063,287 | 12/1977 | van Rosmalen . |
| 4,169,227 | 9/1979 | Malisson et al. . |
| 4,178,064 | 12/1979 | Mrdjen . |
| 4,859,846 | 8/1989 | Burrer . |
| 4,919,499 | 4/1990 | Aiba . |
| 4,942,766 | 7/1990 | Greenwood et al. . |
| 5,121,138 | 6/1992 | Schermer et al. . |
| 5,177,631 | 1/1993 | Orlicki et al. . |
| 5,279,657 | 1/1994 | Phillips et al. . |
| 5,280,163 | 1/1994 | Barkan . |
| 5,280,377 | 1/1994 | Chandler et al. . |
| 5,557,444 | 9/1996 | Melville et al. ............... 359/224 |

*Primary Examiner*—James Phan
*Attorney, Agent, or Firm*—Steven P. Koda, Esq.

[57] ABSTRACT

Two piezoelectric sensors are mounted on the back of a spring-plate of a mechanical resonance scanner on respective sides of a center line coinciding with an axis of rotation. As the scanner mirror rotates back and forth the two sensors are accelerated and decelerated at a 180° phase difference. Each sensor's output voltage crosses a zero level when the acceleration is unchanging. A differential amplifier detects the zero crossings for motion along the axis of rotation. Common mode rejection eliminates the non-rotational accelerations associated with external vibrations and shocks, and prevents masking the mirror's zero-crossings.

9 Claims, 5 Drawing Sheets

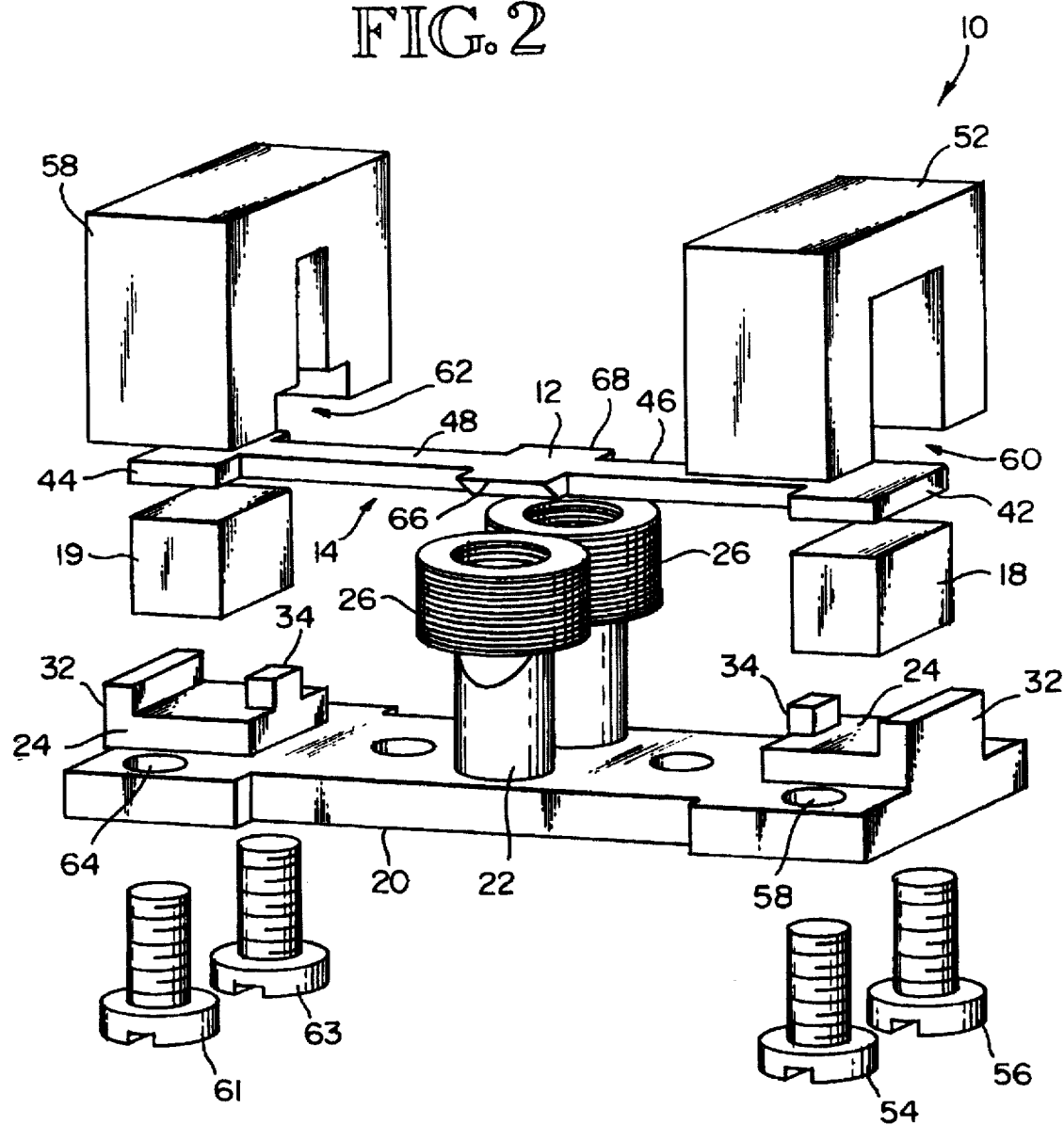

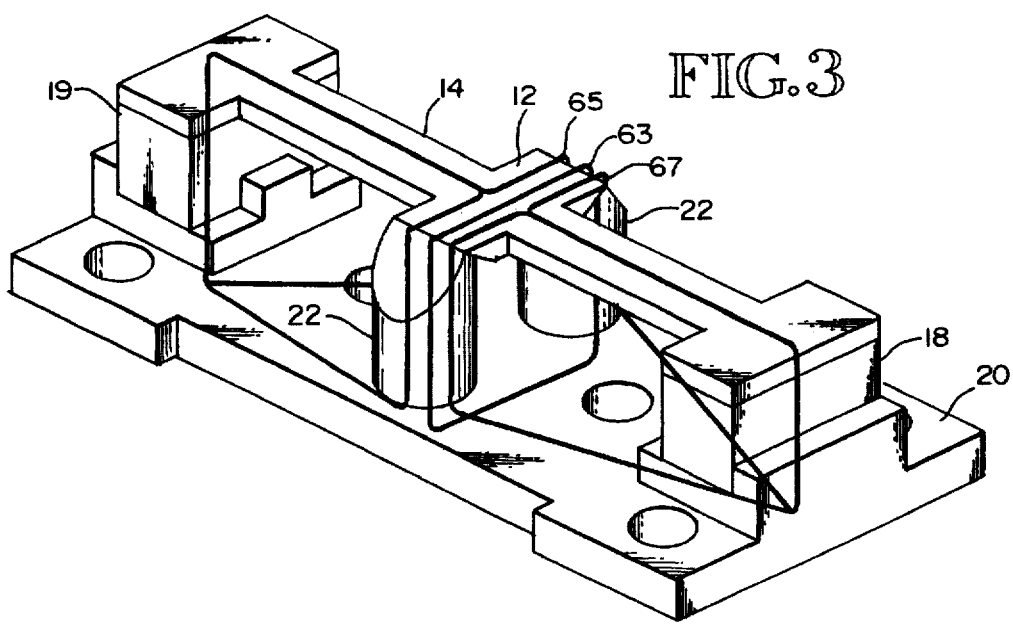
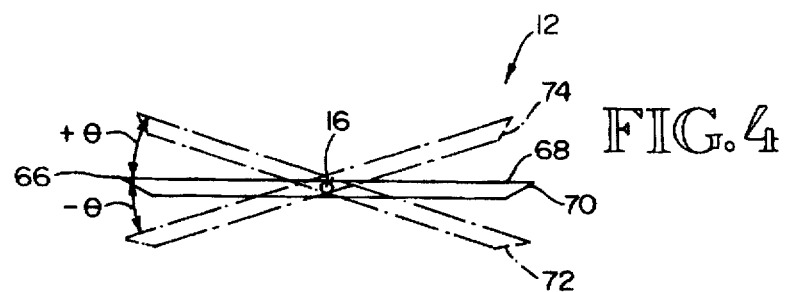
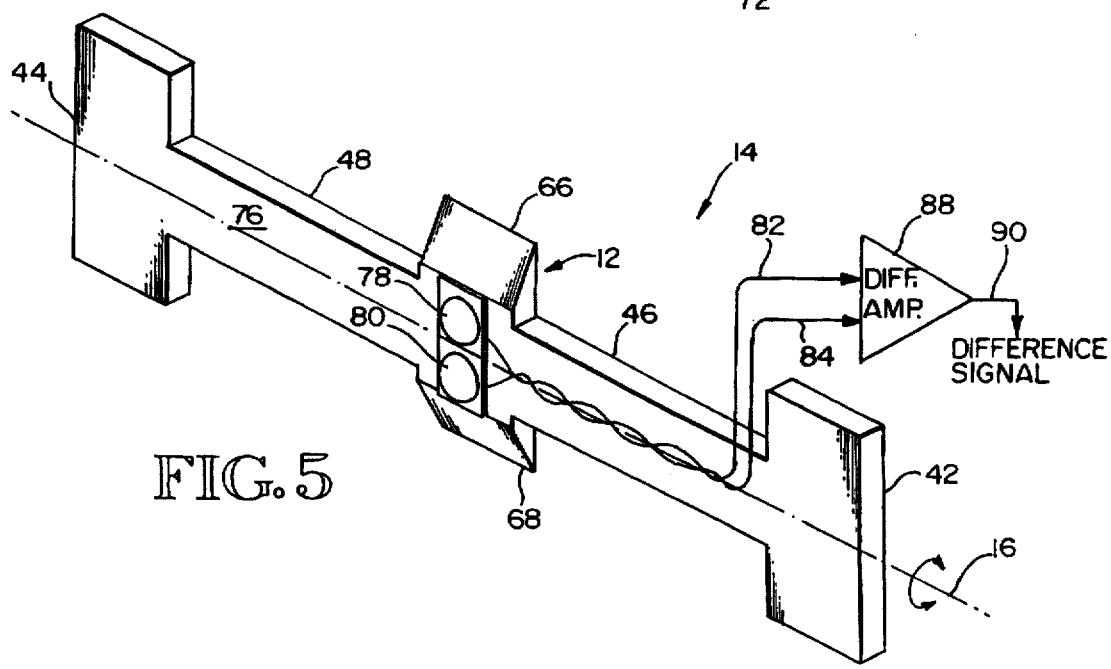

POSITION DETECTION OF MECHANICAL RESONANT SCANNER MIRROR

BACKGROUND OF THE INVENTION

This invention relates to optical scanner devices, and more particularly to a mechanical resonant scanner having a mirror which moves to deflect light along a scanning pattern.

Mechanical resonant scanners are used in retinal display devices to scan an image onto the retina of an eye. In an exemplary configuration one scanner is used to provide horizontal deflection of a light beam, while another scanner is used to provide vertical deflection of the light beam. Together the two scanners deflect the light beam along a raster pattern. By modulating the light beam and implementing multiple colors, a color image is scanned in raster format onto the retina.

Scanning rate and physical deflection distance characterize the movement of the scanner's mirror. In the context of a retinal display the scanning rate and deflection distances are defined to meet the limits of the human eye. For the eye to continually perceive an ongoing image the light beam rescans the image, or a changing image, in periodic fashion. Analogous to refreshing a pixel on a display screen, the eye's retinal receptors must receive light from the scanning light beam periodically. The minimum refresh rate is a function of the light adaptive ability of the eye, the image luminance, and the length of time the retinal receptors perceive luminance after light impinges. To achieve television quality imaging the refresh rate is to be at least 50 to 60 times per second (i.e., ≧50 Hz to 60 Hz). Further, to perceive continuous movement within an image the refresh rate is to be at least 30 Hz.

With regard to the deflection distance, the mirror is deflected to define a raster pattern within the eye. System magnification and distance between the scanner and an eyepiece determine the desired deflection distance.

To define a raster pattern in which millions of bits of information (e.g., light pixels) are communicated onto a small area (i.e., eye retina), the position of the mirror needs to be known to a high degree of accuracy. In a mechanical resonant scanner, the resonant frequency defines the scanning rate. The resonant frequency is determined by a natural frequency of the scanning structure. Conventionally, a mechanical turn-screw is used to tune the resonant frequency to be equal to an image data drive signal (e.g., HSYNC or VSYNC). The resonant frequency, however, changes with environmental changes (e.g., temperature, barometric pressure). This change in resonance changes the phase relationship between the phase of the image data drive signal and the position phase of the mirror position. Accordingly, there is a need to monitor the position of the mirror.

SUMMARY OF THE INVENTION

According to the invention, two piezoelectric sensors are mounted on a spring-plate of a mechanical resonance scanner. The spring-plate supports a mirror or has a polished surface embodying a mirror used for deflecting a beam of light.

According to one aspect of the invention, the two piezoelectric sensors are mounted on respective sides of a center line on the back of the spring plate. Such center line is in parallel with the mirror's axis of rotation. As the mirror rotates back and forth the two sensors are accelerated and decelerated generating sensor output voltages at a 180° phase difference. A sensor output voltage crosses a zero level when the acceleration is unchanging. Both sensors cross the zero level at the same time but with opposite voltage polarity swings.

According to another aspect of the invention, a differential amplifier or other device detects the zero crossing. Such zero crossings correspond to the mirror being at a known position. Specifically, the mirror undergoes zero acceleration at its maximum velocity. Maximum velocity occurs when the mirror is at a level orientation relative to its mirror support structure. Detection of the zero crossover corresponds to the mirror being at this known position.

According to another aspect of this invention, acceleration of the scanner as a whole is differentiated from the accelerations of the mirror within the scanner. The piezoelectric sensors respond to acceleration to define a voltage output signal. In one application the scanner is part of a virtual retinal display worn by a user. Such user is able to move with the scanner. Such motion or other external vibrations or shocks induce voltage onto the piezoelectric sensors. By processing the two piezoelectric sensor output signals at a differential amplifier the common modes of the respective sensors are canceled out. Such common mode rejection eliminates the non-rotational accelerations associated with the external vibrations and shocks, and prevents masking the mirror's zero-crossings.

According to another aspect of the invention, the phase of an image data drive signal used for feeding image data onto the light beam being reflected by the scanner is locked to the position phase of the mirror oscillation action.

According to one advantage of the invention, detection of when the mirror is at the known position is useful for identifying phase difference between the phase of the image data drive signal and the position phase of the mirror. Mirror position phase changes are caused, for example, by changes in temperature. The resulting phase difference is corrected to keep the drive signal and mirror oscillation in phase. By doing so, a uniform raster scanning pattern is defined by one or more scanners. These and other aspects and advantages of the invention will be better understood by reference to the following detailed description taken in conjunction with the accompanying drawings.

BRIEF DESCRIPTION OF THE DRAWINGS

FIG. 2 is an exploded view of the scanner of FIG. 1;

FIG. 3 is a partial perspective view of the scanner of FIG. 1 showing magnetic fields for oscillating the scanner mirror;

FIG. 4 is a diagram of the extreme deflection positions of the scanner mirror;

FIG. 5 is a perspective view of the scanner spring plate and mirror position sensors;

DESCRIPTION OF SPECIFIC EMBODIMENTS

Scanner Overview

Figure 1:
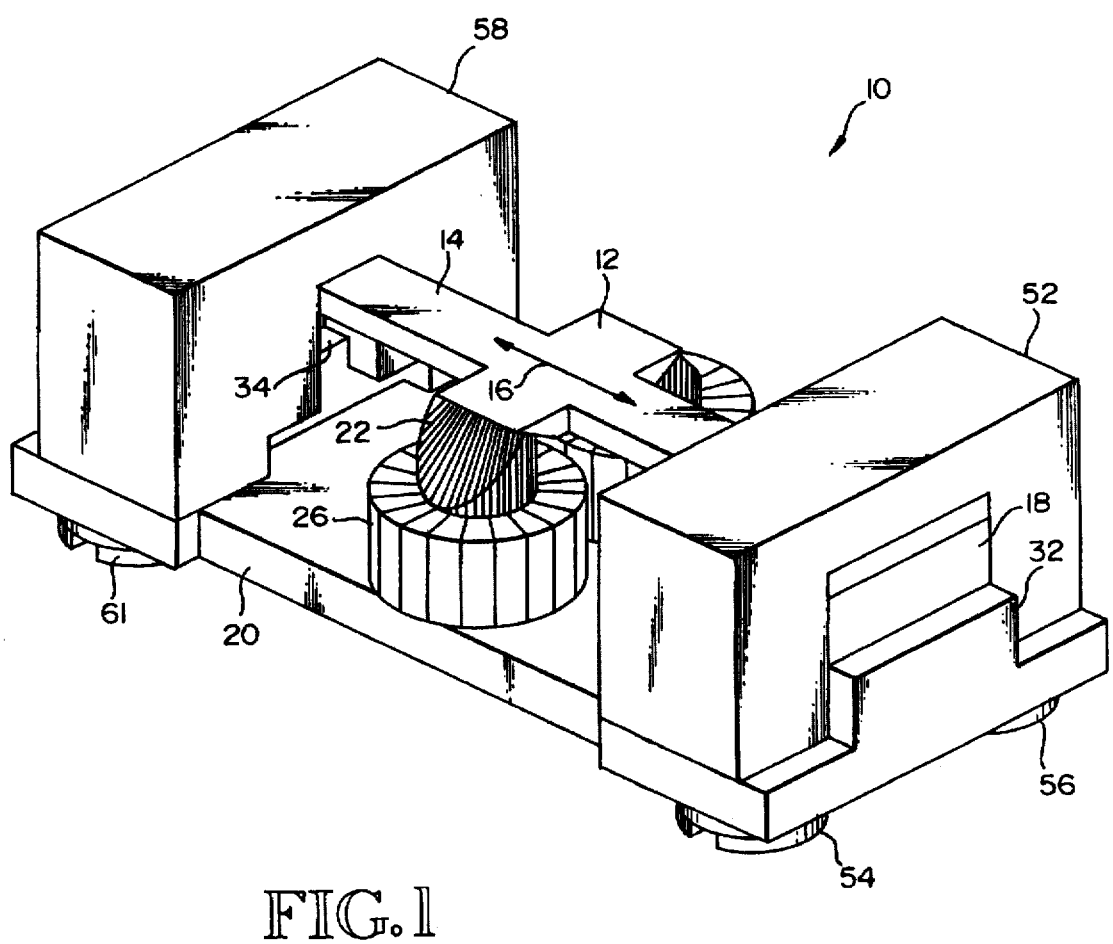
FIG. 1 is a perspective view of a mechanical resonant scanner according to an embodiment of this invention.

FIGS. 1 and 2 show a mechanical resonant scanner 10 having a mirror 12. The mirror 12 is formed integral to or separate from a spring plate 14. In one embodiment the mirror 12 is formed by a smooth, polished reflective surface area of the spring plate 14. In another embodiment the mirror 12 is a separate structure mounted to the spring plate 14. The scanner 10 also includes permanent magnets 18, 19 which create magnetic circuits for moving the mirror 12 at a high oscillating frequency about an axis of rotation 16. In one embodiment the only moving part is the spring plate 16 with mirror 12.

The resonant scanner 10 also includes a base plate 20. A pair of stator posts 22 and magnets seats 24 are formed on the base plate 20. The base plate 20, stator posts 22 and magnet seats 24 preferably are formed of soft iron. In one embodiment the base plate 20 is elongated with a magnet seat 24 formed at each end. Each magnet seat 24 includes a back stop 32 extending up from one end of the seat 24 and a front stop 34 extending up from an opposite end of the seat. The stator posts 22 are centrally located between the magnet seats 24. Respective stator coils 26 are wound in opposite directions about the respective stator posts 22. The coil 26 windings are connected either in series or in parallel to a drive circuit which tunes the oscillating frequency of the mirror 12.

The spring plate 14 is formed of spring steel and is a torsional type of spring having a spring constant determined by its length, width and thickness. The spring plate 14 has enlarged opposite ends 42 and 44 that rest directly on a pole of the respective magnets 18, 19. The magnets 18, 19 are oriented such that they have like poles adjacent the spring plate. For example, the North poles of the magnets 18, 19 are adjacent to the spring plate 14 in one embodiment while the South poles of the magnets 18, 19 are adjacent to the base plate 20. Narrower arm portions 46, 48 of the spring plate 14 extend from each of the enlarged ends 42, 44 to an enlarged central mirror portion 12 of the spring plate 14. The mirror 12 forms an armature for the resonant scanner 10 directly over the stator posts 22. The mirror 12 axis of rotation 16 is equidistant from each of the two the stator posts 22.

The spring plate 14, magnets 18, 19 and base plate 20 are tightly clamped together by respective spring plate caps 52, 58. Each cap 52, 58 is formed as a block with an opening 60/62. The respective opening 60/62 is formed so that each respective cap 52/58 can accommodate a spring plate end 42/44, a magnet 18/19 and a magnet seat 24, as well as part of a spring plate arm 46/48. Cap 52 is held securely to the base plate 20 by a pair of screws 54, 56 so as to clamp the spring plate 14 and magnet 18. The screws 54, 56 extend up through apertures 58 in the base plate 20 on opposite sides of the magnet seat 24 and into threaded apertures formed in the cap 52 on opposite sides of the opening 60. The cap 58 is similarly clamped to the base plate 20 by respective screws 61, 63 that extend up through respective apertures 64 and into threaded apertures formed in the cap 58 on opposite sides of the cap opening 62.

Magnetic Circuits

FIG. 3 shows magnetic circuits formed in the mechanical resonant scanner 10. The magnetic circuits cause the mirror 12 to oscillate about the axis of rotation 16 (see FIG. 1) in response to an alternating drive signal. An AC magnetic field 63 is caused by the stators 22. DC magnetic fields 65, 67 are formed (i) between magnet 18 and one stator 22, (ii) between magnet 19 and such one stator 22, (iii) between magnet 18 and the other stator 22, and (iv) between magnet 19 and the other stator 22. A first magnetic circuit extends from the top pole of the magnets 18 to the spring plate end 42, through the arm 46 and mirror 12, across a gap to one of the stators 22 and through the base plate 20 back to the magnet 18 through its bottom pole. A second magnetic circuit extends from the top pole of the magnet 19 to the spring plate end 44 through the arm 48 and mirror 12, across a gap to the same stator 22 and through the base plate 20 back to the magnet 19 through its bottom pole. A third magnetic circuit extends from the top pole of the magnets 18 to the spring plate end 42, through the arm 46 and mirror 12, across a gap to the other of the stators 22 and through the base plate 20 back to the magnet 18 through its bottom pole. A fourth magnetic circuit extends from the top pole of the magnet 19 to the spring plate end 44 through the arm 48 and mirror 12, across a gap to such other stator 22 and through the base plate 20 back to the magnet 19 through its bottom pole.

When a periodic drive signal such as a square wave is applied to the oppositely wound coils 26, magnetic fields are created which cause the mirror 12 to oscillate back and forth about the axis of rotation 16. More particularly, when the square wave is high for example, the magnetic fields set up by the magnetic circuits through the stator 22 and magnets 18, 19 cause an end 66 of the mirror to be attracted to the stator 22. At the same time, the magnetic field created by the magnetic circuits extending through the other stator 22 and the magnets 18, 19 cause the opposite end 68 of the mirror to be repulsed by the stator 22. Thus, the mirror is caused to rotate about the axis of rotation in one direction. When the square wave goes low, the magnetic field created by the first stator 22 repulses the end 66 of the mirror whereas the other stator 22 attracts the end 68 of the mirror so as to cause the mirror 12 to rotate about the axis 16 in the opposite direction. A periodic square wave causes the mirror 12 to rotate in one direction then another in an oscillatory manner.

Mirror Position Detection

FIG. 4 shows the range of motion of the mirror 12 along its oscillatory path. In the relaxed state the mirror 12 rests flat in a level orientation 70. At one extreme the mirror 12 is deflected rotationally about the axis 16 by an angle +θ to assume a first extreme orientation 72. At the other extreme the mirror 12 is deflected rotationally about the axis 16 by an angle −θ to assume a second extreme orientation 74.

FIG. 5 shows the spring plate 14 underside 76. Two piezoelectric sensors 78, 80 are mounted to the underside 76 opposite the mirror 12. Each sensor 78, 80 is equidistant from the mirror's axis of rotation 16. Accelerated motion of a respective sensor 78/80 induces an electrical voltage across the component piezoelectric material. Changes in acceleration occur as changes in voltage. Zero acceleration corresponds to a constant "zero level" voltage output (e.g., ground or some voltage bias level). Sensor 78 generates an output voltage signal 82. Sensor 80 generates a output voltage signal 84.

As the mirror 12 moves along its deflection path from one extreme orientation 72 to another extreme orientation 74, the mirror accelerates and decelerates. As the mirror 12 approaches the first extreme orientation 72 the mirrors slows then reverses direction. This corresponds to a peak acceleration point. Similarly, as the mirror 12 approaches the second extreme orientation 74 the mirror slows again and reverses direction. This also corresponds to a peak acceleration point. The two peaks correspond to accelerations of opposite magnitude. The mirror 12 achieves maximum velocity as it moves into the level orientation 70. Such maximum velocity corresponds to a zero acceleration point as the mirror stops speeding up and begins slowing down. A zero acceleration point occurs each time the mirror 12 assumes the level orientation 70.

As the zero acceleration point approaches, the sensor 78 voltage magnitude reduces to zero level (e.g., ground or bias voltage level). Similarly, the sensor 80 voltage magnitude also reduces to zero level. The direction of voltage change for the two sensors, however, varies. One is going from positive to negative polarity, while the other is going from negative to positive polarity. The zero crossover occurs at the same time for each sensor. By monitoring the zero crossovers one can detect when the mirror 12 is in the level orientation 70.

In a preferred embodiment the sensor output signals 82, 84 are input to a differential amplifier 88. The amplifier 88 performs a common mode rejection outputting a difference signal 90, which is the difference between the voltages of the two signals 82, 84. The piezoelectric sensors 78, 80 respond to motion acceleration in any direction. Ideally the acceleration is only rotational about the axis of rotation 16. However, the scanner 10 itself is moving in some applications. To prevent such common motion from casing false zero crossover detections, the difference between the sensor output signals 82, 84 is monitored. The differential amplifier 88 subtracts out the voltage component corresponding to a common motion direction of the two sensors 78, 80. Any motion occurring along the axis of rotation 16 is sensed by each sensor 78, 80 having opposite directions and is not subtracted out. Any motion occurring along another axis is sensed in common by the sensors 78, 80 and is subtracted out. As a result, only the voltage components corresponding to motion in the rotational direction about axis 16 causes a zero crossover to be detected. The difference signal varies over time according to the oscillating path of the mirror 12 about the axis of rotation. The difference signal 90 exhibits a zero level at each zero acceleration position of the mirror (i.e., the level orientation 70). Thus, the difference signal 90 indicates the phase position of the mirror.

Virtual Retinal Display

Figure 6:
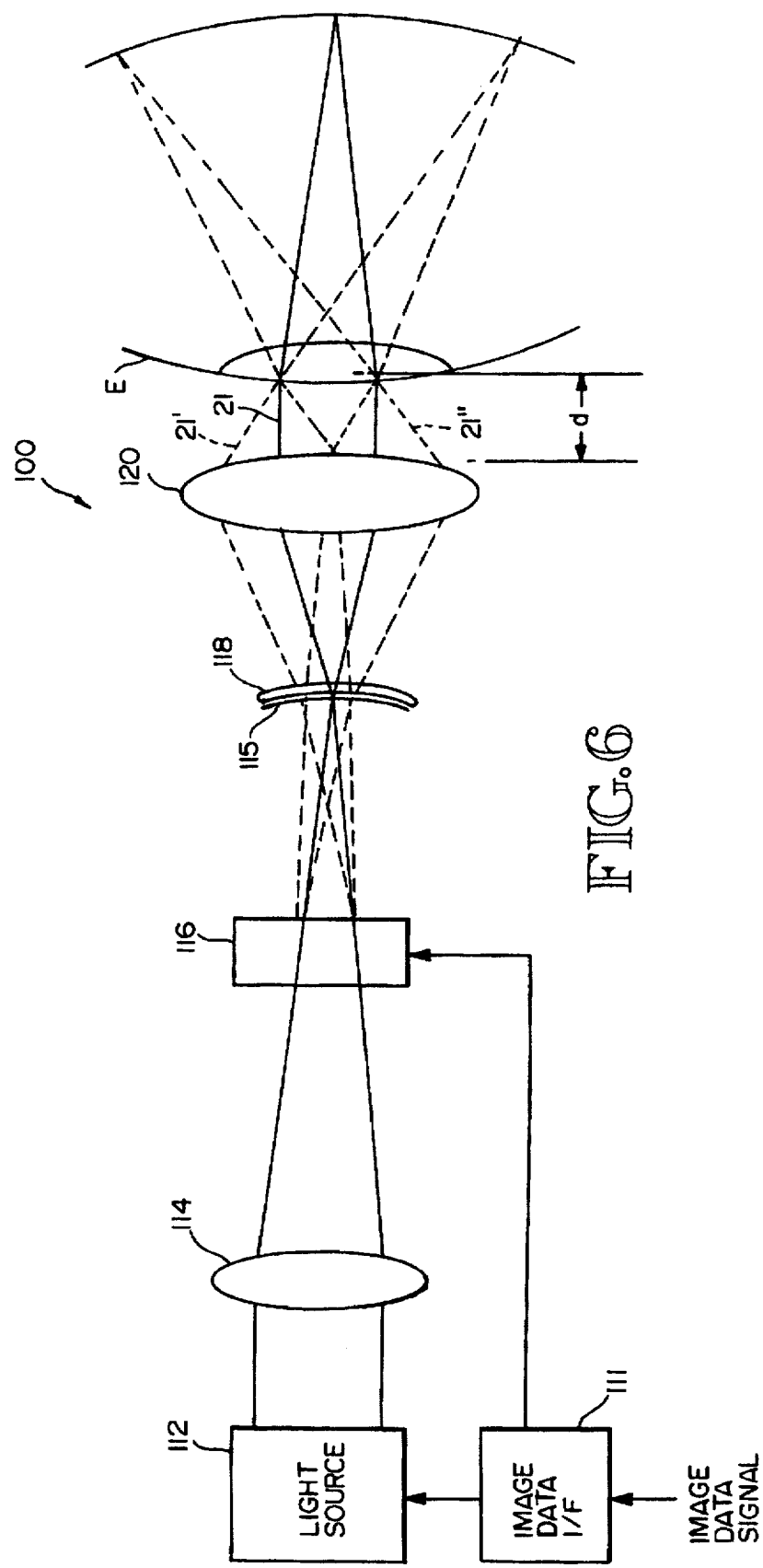
FIG. 6 is an optical diagram of a virtual retinal scanner including a mechanical resonant scanner of FIG. 1.

FIG. 6 shows a block diagram of a virtual retinal display 100 using a mechanical resonant scanner embodiment of this invention. The display 100 receives image data from a computer device, video device or other digital or analog image data source. Light generated by the display 100 is altered according to the image data to scan an image into the retina of a viewer's eye E.

The retinal display 100 generates and manipulates light to create color or monochrome images having narrow to panoramic fields of view and low to high resolutions. Light modulated with video information is scanned directly onto the retina of a viewer's eye E to produce the perception of an erect virtual image. The retinal display is suitable for hand-held operation or for mounting on the viewer's head.

The retinal display 100 includes an image data interface 111, a light source 112, an optics subsystem 114, a scanning subsystem 116, an exit pupil expanding apparatus 118, and an eyepiece 120. The image data interface 111 receives a video or other image data signal, such as an RGB signal, NTSC signal, VGA signal or other formatted color or monochrome video or image data signal. The image data interface 111 extracts color component signals from the received image data signal. In an embodiment in which an image data signal has embedded red, green and blue components, the red signal is extracted and routed to a first modulator for modulating a red light source output. Similarly, the green signal is extracted and routed to a second modulator for modulating a green light source output. Also, the blue signal is extracted and routed to a third modulator for modulating a blue light source output. The image data signal interface 111 also extracts a horizontal synchronization component and vertical synchronization component from the received image data signal. In one embodiment, such signals define respective frequencies for a horizontal scanner and vertical scanner drive signals. Such synchronization components or drive signals are routed to the scanning subsystem 116.

The light source 112 includes a single or multiple light sources. For generating a monochrome image a single monochrome source typically is used. For color imaging, multiple light sources are used. In one embodiment red, green and blue light sources are included. Exemplary light sources are colored lasers, laser diodes or light emitting diodes (LEDs). Although LEDs do not output coherent light, lenses are used in one embodiment to shrink the apparent size of the LED light source and achieve flatter wave fronts. In another LED embodiment a single mode monofilament optical fiber receives the LED output to define a point source which outputs light approximating spatially coherent light. The light sources or their output beams are modulated according to the input image data signal content to produce light which is input to the optics subsystem 114. In one embodiment the emitted light is coherent. In another embodiment the emitted light is noncoherent.

The optics subsystem 114 serves as an objective to focus the light. For some embodiments in which noncoherent light is received, the optics subsystem 114 also collects the light. Left undisturbed the light output from the optics subsystem 114 converges to a focal point then diverges beyond such point. When the converging light is deflected, however, the focal point is deflected. The pattern of deflection defines a pattern of focal points. Such pattern is referred to as the intermediate image plane 115.

Prior to the image plane 115 is the scanning subsystem 116. The scanning subsystem 116 deflects the light and the ensuing focal point to define the intermediate image plane 115 of focal points. Typically the light is deflected along a raster pattern. In one embodiment the scanning subsystem 116 includes a resonant scanner 10 for performing horizontal beam deflection and a galvanometer for performing vertical beam deflection. The scanner 10 serving as the horizontal scanner receives a drive signal having a frequency defined by the horizontal synchronization signal extracted at the image data interface 111. Similarly, the galvanometer serving as the vertical scanner receives a drive signal having a frequency defined by the vertical synchronization signal VSYNC extracted at the image data interface. Preferably, the horizontal scanner 10 has a resonant frequency corresponding to the horizontal scanning frequency.

The exit pupil expanding apparatus 18 is optional and when present coincides with the intermediate image plane 115. The apparatus 18 serves to spread light over a larger surface area at the eyepiece 20. The exit pupil expanding apparatus 18 generates multiple closely spaced (or overlapping) exit pupils and/or enlarges the exit pupil(s). A diffractive optical element embodiment generates multiple exit pupils. A fiber-optic face plate embodiment, lens array embodiment or diffuser embodiment enlarges a single exit pupil. The light output from the exit pupil expanding apparatus 18 travels to the eyepiece 20. The expanded exit pupil(s) occur slightly beyond the eyepiece 20 at a location where a viewer positions the pupil of their eye E.

The eyepiece 20 typically is a multi-element lens or lens system. In an alternative embodiment the eyepiece 120 is a single lens. The eyepiece 120 contributes to the location where an exit pupil 21 of the retinal display 100 forms. The eyepiece 120 defines an exit pupil at a known distance d from the eyepiece 120. Such location is the expected location for a viewer's eye E. The eyepiece 120 preferably is positioned at one focal distance from the intermediate curved image plane 115. In an alternative embodiment the relative distance between the image plane 115 and eyepiece is variable. In the case where the relative distance is slightly less than one focal length, the size and apparent depth of the image formed in the viewer's eye changes.

Correcting for Mirror/Drive Signal Phase Errors

Figure 7:
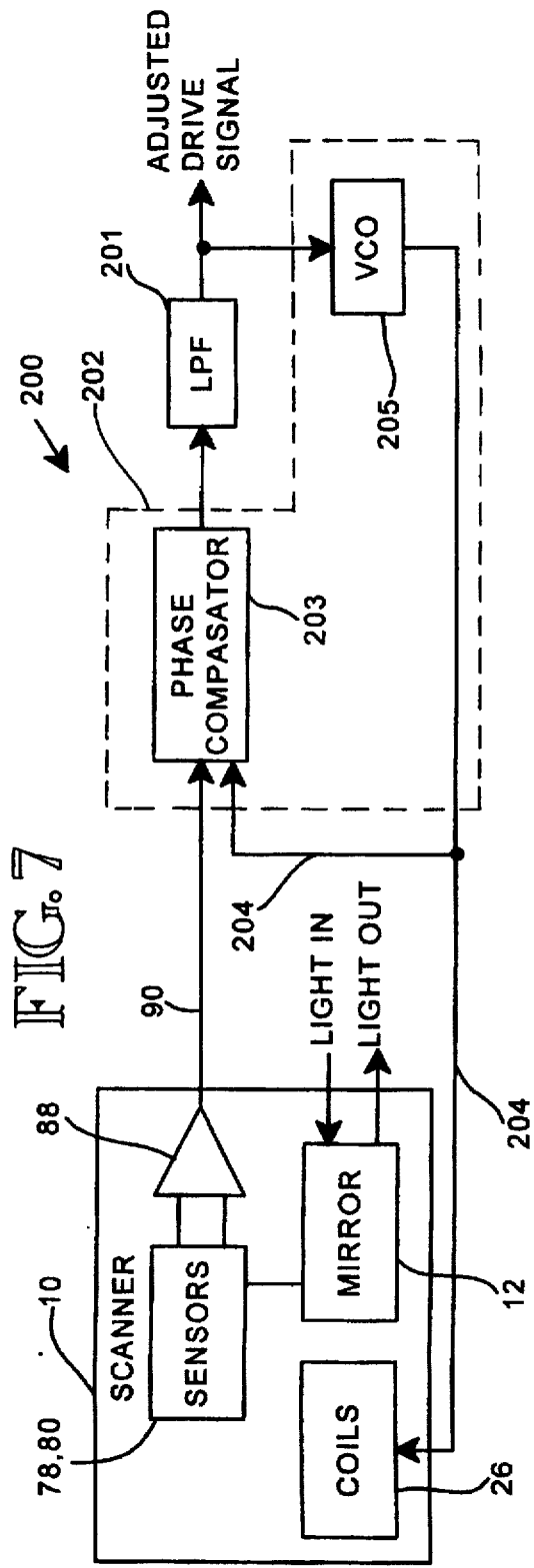
FIG. 7 is a circuit block diagram of a circuit for locking scanner drive signal phase to the phase of a mirror's oscillation.

To correct for phase errors between a scanner's drive signal and the mirror 12 oscillation, a phase locking circuit 200 is implemented as shown in FIG. 7. The phase locking circuit 200 is formed by a mechanical resonant scanner 10, a phase locked loop circuit (PLL) 202 and a low pass filter 201. The PLL 202 includes a phase comparator 203 and a voltage controlled oscillator 205. As described above, the resonant scanner 10 receives incoming light and reflects outgoing light at the mirror 12. The scanner 10 also receives a drive signal 204 for energizing electromagnetic coils 26 which deflect the scanner's mirror 12. The scanner 10 generates the difference signal 90 at the differential amplifier 88.

The phase comparator 203 receives the difference signal 90 and the scanner's drive signal 204. The difference signal 90 serves as a reference signal and corresponds to the position phase of the mirror 12. The phase of the drive signal is adjusted to align (e.g., coincide or be 180° out of phase) with the phase of the difference signal 90. The phase comparator 203 output is received by the low pass filter 201 then in turn to the voltage controlled oscillator (VCO) 205. The adjusted drive signal is output from the VCO 202 to the scanner 10. In the embodiment shown in FIG. 7 the phase locking circuit is running at the drive signal 204 frequency.

Figure 8:
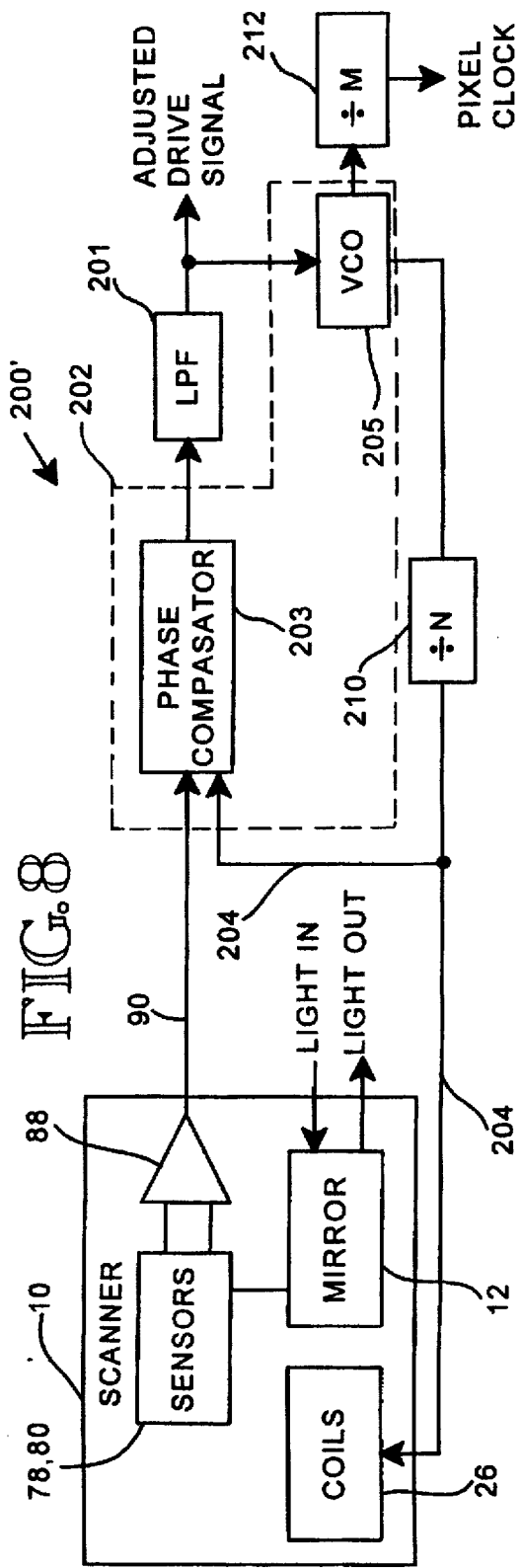
FIG. 8 is a circuit block diagram of a phase locking circuit in an alternative embodiment in which a pixel clock signal is derived.

FIG. 8 shows an alternate embodiment in which a pixel clock signal is derived. The pixel clock signal is routed to the light source subsystem 112 to serve as a horizontal synchronization signal. In this embodiment the phase locking circuit 200' is operating at a frequency greater than the drive signal 204 frequency. Thus, the output from the VCO 205 is divided by some factor N to obtain the drive signal 204 frequency. A divider 210 performs the divide by N operation. The pixel lock also is derived from the VCO 205 output by dividing the signal by an appropriate factor M at a divider 212.

For either of the FIG. 7 or FIG. 8 embodiments when the resonance frequency of the scanner varies due to environmental impacts, such as changes in temperature, the drive signal 204 is adjusted to align the drive signal phase to the altered mirror position phase. For the FIG. 8 embodiment the phase of the pixel clock is similarly adjusted.

Meritorious and Advantageous Effects

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. An optical resonant scanner, comprising:

a reflective surface for deflecting light, the reflective surface alternately rotating about an axis of rotation in a first direction and a second direction, wherein the rotation in the first direction occurs between a first extreme rotational position and a second extreme rotational position, and wherein the rotation in the second direction occurs between the second extreme rotational position and the first extreme rotational position, wherein the alternate rotation about the axis of rotation defines an oscillatory motion of the reflective surface, and wherein the reflective surface undergoes zero acceleration during said oscillatory motion at a third rotational position occurring between the first extreme rotational position and the second extreme rotational position;

a first sensor generating a first output signal varying as a function of accelerated movement of the first sensor and having a zero level in the absence of accelerated movement;

a second sensor generating a second output signal varying as a function of accelerated movement of the second sensor and having a zero level in the absence of accelerated movement, wherein the first sensor and second sensor are equidistant from the axis of rotation and move with the reflective surface, and wherein the first sensor and second sensor are oriented to generate respective first output signal and second output signal components at a 180 degree phase difference attributable to acceleration about the axis of rotation;

means for differencing the first output signal and second output signal to generate a difference signal having a zero level whenever the reflective surface is at the third rotational position.

2. The scanner of claim 1 in which the differencing means comprises a differential amplifier performing common mode rejection on the first output signal and second output signal.

3. The scanner of claim 1, in which the oscillatory motion is characterized by a first frequency, and further comprising:

an actuation circuit for moving the reflective surface in said oscillatory motion, the actuation circuit receiving a drive signal; and a phase locked loop for locking phase of the drive signal to phase of the oscillatory motion so as to be either one of in phase or at a 180 degree phase difference.

4. The scanner of claim 3, in which the drive signal has a frequency equal to the first frequency.

5. A method for identifying a known position of a reflective surface within an optical resonant scanner, the reflective surface deflecting light along a scan path, the reflective surface alternately rotating about an axis of rotation in a first direction and a second direction, wherein the rotation in the first direction occurs between a first extreme rotational position and a second extreme rotational position, and wherein the rotation in the second direction occurs between the second extreme rotational position and the first extreme rotational position, wherein the alternate rotation about the axis of rotation defines an oscillatory motion of the reflective surface, and wherein the reflective surface undergoes zero acceleration during said oscillatory motion at a third rotational position occurring between the first extreme rotational position and the second extreme rotational position; the method comprising the steps of:

generating a first output signal at a first sensor, the first output signal varying as a function of accelerated movement of the first sensor and having a zero level in the absence of accelerated movement;

generating a second output signal at a second sensor, the second output signal varying as a function of accelerated movement of the second sensor and having a zero level in the absence of accelerated movement, wherein the first sensor and second sensor are equidistant from the axis of rotation and move with the reflective surface, and wherein the first sensor and second sensor are oriented to generate respective first output signal and second output signal components at a 180 degree phase difference attributable to acceleration about the axis of rotation; and differencing the first output signal and second output signal to generate a difference signal having a zero level whenever the reflective surface is at the third orientation.

6. The method of claim 5 in which the step of differencing comprises performing common mode rejection on the first output signal and second output signal.

7. The method of claim 5, in which the oscillatory motion is characterized by a resonant frequency, and in which an actuation circuit moves the reflective surface in said oscillatory motion, the method further comprising the step of receiving a drive signal; and locking phase of the drive signal to phase of the oscillatory motion so as to be either one of in phase or at a 180 degree phase difference.

8. An optical resonant scanner, comprising:

a reflective surface for deflecting light, the reflective surface alternately rotating about an axis of rotation in a first direction and a second direction, wherein the rotation in the first direction occurs between a first extreme rotational position and a second extreme rotational position, and wherein the rotation in the second direction occurs between the second extreme rotational position and the first extreme rotational position, wherein the alternate rotation about the axis of rotation defines an oscillatory motion of the reflective surface, and wherein the reflective surface undergoes zero acceleration during said oscillatory motion at a third rotational position occurring between the first extreme rotational position and the second extreme rotational position;

a first sensor generating a first output signal varying as a function of accelerated movement of the first sensor and having a zero level in the absence of accelerated movement;

a second sensor generating a second output signal varying as a function of accelerated movement of the second sensor and having a zero level in the absence of accelerated movement, wherein the first sensor and second sensor are equidistant from the axis of rotation and move with the reflective surface, and wherein the first sensor and second sensor are oriented to generate respective first output signal and second output signal components at a 180 degree phase difference attributable to acceleration about the axis of rotation; and a difference signal derived from the first output signal and second output signal and having a zero level whenever the reflective surface is at the third rotational position.

9. The scanner of claim 8, in which the oscillatory motion is characterized by a resonant frequency, and further comprising: a drive signal which energizes an electromagnet for actuating the oscillatory motion; and a phase locked loop for locking phase of the drive signal to phase of the oscillatory motion so as to be either one of in phase or at a 180 degree phase difference.

* * * * *